(No Model.)
P. DIEHL.
MECHANICAL MOVEMENT.
No. 541,840. Patented July 2, 1895.
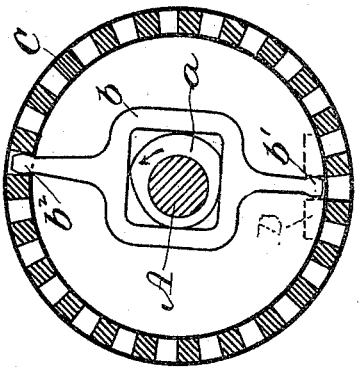
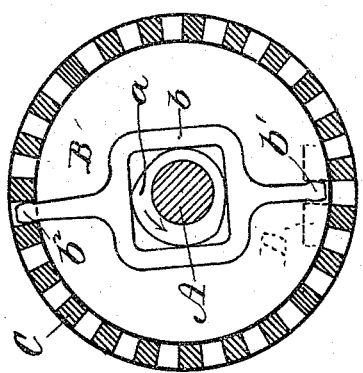
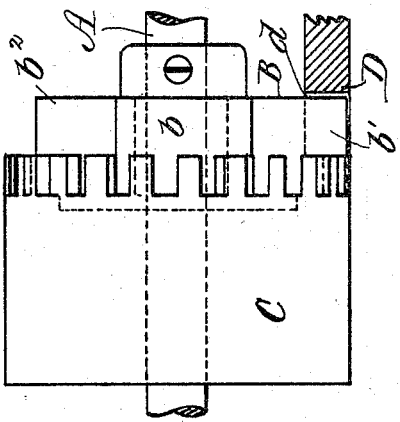
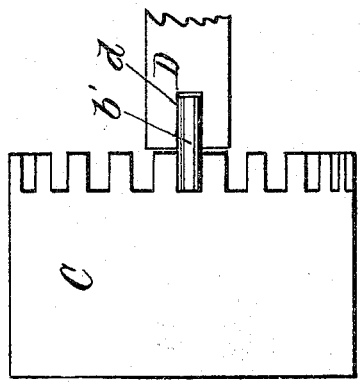
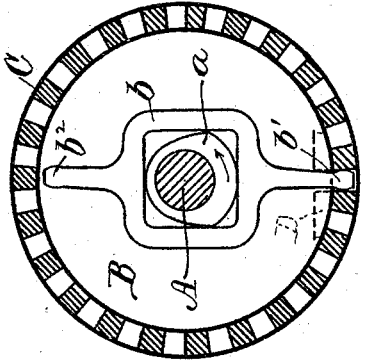
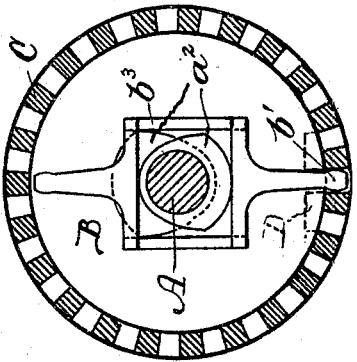
WITNESSES:
Geo. B. Whiting
C. M. Sweeney.
INVENTOR:
Philip Diehl,
BY
Henry Calver,
ATTORNEY.

UNITED STATES PATENT OFFICE.

PHILIP DIEHL, OF ELIZABETH, NEW JERSEY, ASSIGNOR TO THE SINGER MANUFACTURING COMPANY, OF NEW JERSEY.

MECHANICAL MOVEMENT.

SPECIFICATION forming part of Letters Patent No. 541,840, dated July 2, 1895.

Application filed March 18, 1895. Serial No. 542,112. (No model.)

*To all whom it may concern:*

Be it known that I, PHILIP DIEHL, a citizen of the United States, residing at Elizabeth, in the county of Union and State of New Jersey, have invented certain new and useful Improvements in Mechanical Movements, of which the following is a specification, reference being had therein to the accompanying drawings.

My invention relates to a mechanical movement whereby a positive intermittent rotary motion may be imparted to a wheel or shaft from a cam or cams on a continuously rotating shaft, the construction of the parts being such that if the direction of rotation of the driving cam or cams be reversed the direction of rotation of the driven wheel or shaft will also be reversed, so that if my invention be incorporated into a machine (such, for example, as a fancy stitch sewing machine) in which a particular timing of devices operated from the driven wheel or shaft must always be maintained with relation to mechanism operated from the shaft carrying the driving cam or cams, it will be impossible, by accidentally turning the machine backward, for one part of the mechanism to get out of proper timing with the other.

In carrying my invention into effect the driving shaft is provided with a cam or cams surrounded by a yoke forming part of a sliding and vibrating lever-dog the opposite ends of which are adapted for alternate engagement with the teeth of a gear wheel to be intermittingly rotated from the said driving shaft, said gear wheel forming part of or being rigidly connected with any suitable cam, wheel or shaft to be intermittingly driven, and the sliding and vibrating movements of the said lever-dog being alternated with each other. Thus the said dog will, by the movements of its driving cam or cams, first be slid longitudinally to disengage one of its ends from the teeth at one side of the gear wheel and engage its other end with the teeth at the opposite side of said gear wheel, and said dog will then be swung to rotate said gear wheel to the extent of one tooth, and in this swinging movement of said dog its holding end will be held stationary by a fixed fulcrum piece or guide so that said dog will swing from the end thus held fast. The continued rotation of the cam or cams will next cause a reverse sliding movement of the dog, to disengage its operating end from the teeth of the gear wheel and to engage its holding end with the teeth on the opposite side of said wheel, and the said dog will then be swung reversely to its first position.

In the accompanying drawings Figures 1, 2 and 3 are sectional elevations of my invention, with the parts in different positions in the several figures. Figs. 4 and 5 are elevations, at right angles to each other, of the same. Fig. 6 illustrates a slightly modified form of my invention.

A denotes a rotating driving shaft carrying a cam $a$ surrounded by a yoke $b$ forming part of a sliding and vibrating lever-dog B one end $b'$ of which is the holding end and the other, $b^2$, the operating end of said dog.

C denotes a gear wheel (preferably formed as a crown gear wheel, as shown) across which the lever-dog slides so that the opposite ends of the latter may be alternately engaged with and disengaged from the teeth of said wheel.

D is a fixed fulcrum piece or guide having a slot $d$ entered by a portion of the holding end $b'$ of the lever-dog to maintain that end of said dog stationary when the other end of the said dog is to swing to rotate the wheel C, the said dog being of such length that when one of its ends is fully engaged with the teeth of said wheel its other end will be fully disengaged from the wheel teeth, and being of such width that its end $b'$ may engage both the teeth of the wheel C and the slotted piece or guide D.

The operation is as follows: When the shaft A is rotated the cam $a$, acting on the yoke $b$ of the lever-dog, will slide said dog across the gear wheel C to disengage the holding end $b'$ of said dog from the teeth of said wheel and to engage the operating end $b^2$ of said dog with the teeth at the opposite side of said wheel. Continued rotation of said cam now causes the operating end of the lever dog to swing to the extent of one tooth of the wheel C, the opposite end of said dog being meanwhile maintained stationary by the fulcrum piece or guide D. The lever-dog next slides back to disengage its operating end $b^2$ from the teeth of the wheel and to engage its holding end with said wheel, so as to positively hold the latter stationary when, in the continued rotation of the cam, the said dog is reversely swung to its first position. Thus the wheel C will be intermittingly and positively rotated and will be positively locked from rotation during the return swinging movements of the lever-dog one or the other of the ends of which will always be in engagement with the teeth of the wheel C. A reverse rotation of the driving shaft A will cause a positive reverse rotation of the said wheel C, so that a mechanism operated by the latter will always be kept in proper timing with the driving shaft A.

The operating cam may be made as a double cam $a^2$ and the yoke as a double yoke $b^3$, as shown in Fig. 6, if desired, to give a swinging throw to said dog different from its sliding throw, this construction of the cam and yoke being the same as that long employed in four motioned sewing machine feeds.

Having thus described my invention, I claim and desire to secure by Letters Patent—

1. The combination with a continuously rotating shaft provided with a cam, of a sliding and vibrating lever-dog having a yoke embracing said cam, a wheel or device to be intermittingly rotated, and a fixed fulcrum piece or guide at one end of said lever-dog and which prevents said end from vibrating when its opposite end is to swing.

2. The combination with the shaft A having the cam $a$, of the wheel C to be intermittingly rotated, the lever-dog B comprising the yoke $b$, surrounding said cam, and the holding and operating ends or parts $b'$ and $b^2$, the said lever-dog being entirely within the periphery of said wheel, and the slotted fulcrum piece or guide D at one end of said lever-dog.

In testimony whereof I affix my signature in presence of two witnesses.

PHILIP DIEHL.

Witnesses:
HENRY CALVER,
JOSEPH F. JAQUITH.